US006830614B2

(12) United States Patent
Hudson et al.

(10) Patent No.: US 6,830,614 B2
(45) Date of Patent: Dec. 14, 2004

(54) WAX COMPOSITION FOR CONSTRUCTION BOARD APPLICATION

(75) Inventors: Carl W. Hudson, Woolwich Township, NJ (US); Anthony P. Hennessy, Epsom (GB)

(73) Assignee: ExxonMobile Research and Engineering Co., Annandale, NJ (US)

( * ) Notice: Subject to any disclaimer, the term of this patent is extended or adjusted under 35 U.S.C. 154(b) by 4 days.

(21) Appl. No.: 10/348,370

(22) Filed: Jan. 21, 2003

(65) Prior Publication Data

US 2004/0139885 A1 Jul. 22, 2004

(51) Int. Cl.[7] .......................... C08L 91/06; C08L 91/08; C08L 97/02
(52) U.S. Cl. ..................... 106/270; 106/271; 106/272; 106/164.01; 106/164.42; 208/21; 524/35
(58) Field of Search ........................... 106/270, 164.01, 106/164.42, 271, 272; 208/21; 524/35

(56) References Cited

U.S. PATENT DOCUMENTS

| | | | |
|---|---|---|---|
| 3,085,026 A | | 4/1963 | Weisgerber et al. .......... 117/60 |
| 3,394,096 A | * | 7/1968 | Harvey ....................... 524/479 |
| 4,118,203 A | * | 10/1978 | Beardmore et al. ........... 44/275 |
| 6,183,849 B1 | | 2/2001 | Lindsay et al. .......... 428/292.4 |

FOREIGN PATENT DOCUMENTS

GB              1367902         9/1974      .......... D06M/15/26

OTHER PUBLICATIONS

O.H.H. Hsu and H.S. Bender: "Water Repellent Efficacy of Wax Used in Hardboard", Ind. Eng. Chem. Res., vol. 27, 1988, pp. 1296–1300, XP009030963.
W. Hsu et al: "The Effect of Wax Type and Content on Waferboard Properties", International Conference on Composite Materials, XX, XX, Apr. 3, 1990–Apr. 5, 1990, pp. 85–93, XP001106475.
C.G. Carll: "Review of Thickness Swell in Hardboard Siding", General technical Report FPL–GTR–96, Jan. 1997, pp. 1–10, XP002280665.
"Wood", Encyclopedia Britannica Article, pp. 1–7, XP002280666 (May 2004).
"Waxes", European Wax Federation, pp. 1–3, XP002280667 (May 2004).

* cited by examiner

Primary Examiner—David Brunsman

(57) ABSTRACT

Wax compositions suitable for use in making construction boards are prepared by blending a wax or oil having a low n-paraffin content with a wax having a higher n-paraffin content to provide a wax composition having at least 21 wt % of n-paraffins.

10 Claims, 2 Drawing Sheets

US 6,830,614 B2

WAX COMPOSITION FOR CONSTRUCTION BOARD APPLICATION

FIELD OF INVENTION

The present invention relates generally to wax compositions for construction board applications. More particularly the invention is concerned with, among other things, a method for determining the suitability of various waxes for use in construction board applications, and for preparing suitable wax compositions.

BACKGROUND OF INVENTION

Composite board products used in construction applications such as particleboard, medium density fiberboard, oriented strand board and the like have been produced for many years and their method of manufacture is well known in the industry.

The primary component of these composite materials is a natural fibrous material. In forming the board product the fibrous material typically is combined with a minor amount of resin and a waxy composition, formed into sheets and subjected to pressure and heat.

In selecting wax compositions for use in construction board applications the focus has theretofore been placed on oil content and stream grade or viscosity range, i.e., the SUS viscosity at 100° F. This viscosity typically is given as a "Neutral" member, e.g., 100N, 300N etc. In any event, previous studies, using both emulsions and neat applications of waxes have shown trends indicating improved board properties with lighter stream grade waxes, e.g., below grade 30 (550N) and for waxes with lower oil content. For example "The Effect of Wax Type and Content on Waferboard Properties", Hsu, et al, International Particleboard/Composite Materials Symposium, Apr. 3–5, 1990, pp. 85–93 discusses waferboard swelling in response to 0 to 45% wax content and 0 to 30 wt % oil content; and U.S. Pat. No. 6,183,849 discloses preparing composite boards using waxes with oil content greater than 30 wt %.

Experience has shown that use of low wax stream grades, i.e., grades below 30 (550N) in producing composite boards, board quality and performance typically is fine; however, when using high wax stream grade, i.e., above about 30 (550N) problems with board quality often are encountered. This is particularly troublesome since it often is desirable to employ higher grade stream waxes for safety and environmental reasons. For example, in the production of oriented strand boards heavy steam grade waxes are desirable to minimize volatility in presses that typically operate at over 400° F. (205° C.).

Consequently, there is a need to be able to predict the suitability of a wax composition for composite board manufacture, and to be able to adjust the wax composition, if needed, to be suitable for such board manufacture. Also, there is a need to be able to adjust the volatility of wax compositions to be used in construction board applications to meet emission requirements. Additionally, the ability to blend numerous product streams into a suitable wax composition offers suppliers flexibility in meeting market needs.

The present invention is directed to these and other needs.

SUMMARY OF INVENTION

Very simply, the present invention is based on the discovery that the n-paraffin content of a wax composition is the key compositional parameter for waxes used in construction board and this n-paraffin content should be at least 21 wt % for the wax composition to be suitable. Thus the suitability of a wax for construction board applications can be determined based on its n-paraffin content, and blends of waxes and oils and oils can be composed to meet the required n-paraffin content.

These, and other features, will be described in greater detail hereinafter.

DETAILED DESCRIPTION OF INVENTION

Figure 1:
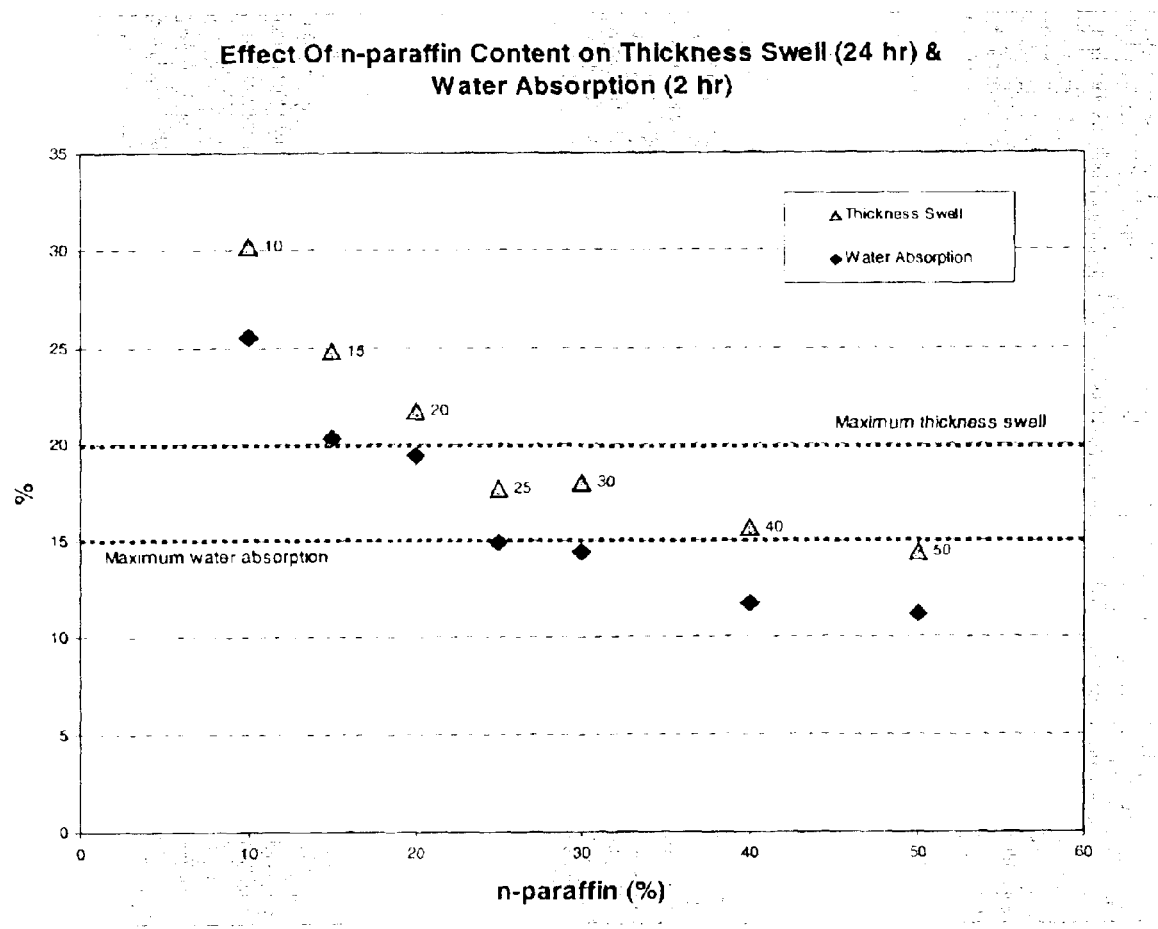
FIG. 1 illustrates the effect of n-paraffin content on thickness swell.

Composite board products used in the construction industry such as particle board, medium density fiberboard, wafer board, oriented strand board and the like are typical manufactured from natural fibrous materials, resin and a wax composition.

The natural fibrous materials typically used include wood chips, wafers, saw dust, wood fibers, cotton and other plant fibers, straw, bamboo cellulose and the like. The fibrous material generally comprises about 90 to 98 wt % of the final board product.

Resins used in the production of manufactured board materials are well known to those skilled in the art of making construction board products and the choice will depend upon the particular compositional and economic needs of the manufacturer. Non-limiting examples of such resins are those thermosetting resins produced by the polycondensation of formaldehyde with other suitable compounds. Illustration of these are phenol formaldehyde, urea formaldehyde, and malamine formaldehyde resins.

The wax composition used in composite board manufacture comprises one or more natural, synthetic or petroleum waxes and a hydrocarbonaceous oil.

Synthetic waxes include waxes made by Fisher-Tropsch process from synthesis gas. Other synthetic waxes include polyethylene wax, ethylene copolymer wax, carbo waxes.

Petroleum waxes include waxes recovered by, e.g., the solvent dewaxing of waxy hydrocarbon oil streams as part of the petroleum refinery process including slack waxes and also includes hydrocracked waxes. Other petroleum waxes include waxy petroleum stocks such as waxy distillates, raffinates, petrolatum, microcrystalline waxes, etc.

In the present invention the wax compositions contain at least 21 wt % n-paraffins, for example from 21 wt % to about 90 wt % and preferably between 21 wt % to 30 wt % n-paraffins based on the weight of the total wax composition.

Analyses of typical waxes used in construction board applications have shown a wide range of n-paraffin content that decreases the average molecular weight of the wax increases. Typical n-paraffin content ranges for various stream guides is given in Table 1.

TABLE 1

| Grade (SUS) | % n-paraffins |
|---|---|
| 100–300 | 45–65 |
| 300–500 | 35–50 |
| 500–650 | 10–35 |
| 650–850 | 5–20 |
| 850+ | 0–10 |

Bright stock slack wax and microcrystalline wax typically do not contain significant quantities of normal paraffins.

Thus, the suitability of wax compositions in grades higher than about grade 30 for construction board applications is determined by analysis of the n-paraffin content of the wax with those having a n-paraffin content of at least 21 wt % being deemed suitable.

Wax compositions that meet the suitability requirement may be blended with the same or different viscosity grade wax composition and still meet suitable board performance so long as the minimum 21 wt % n-paraffin content is met. Thus the volatility can be adjusted as necessary, and even the economics may be influenced. A scheme of blending parameters and their impact on the wax composition is given in Table 2.

TABLE 2

| Component | Typical Impact On Composition |
|---|---|
| Initial non-blended slack wax | Sets initial n-paraffin content, oil content and volatility |
| same viscosity/grade | No change in volatility |
| Foots oil or soft wax | Increases oil content |
| Fully refined wax | Increases n-paraffin content, lowers oil content |
| High n-paraffin wax[1] | Increases in n-paraffin content, lowers oil content |

TABLE 2-continued

| Component | Typical Impact On Composition |
|---|---|
| DWO[2] - lube basestock | Lowers n-paraffin content, raises oil content |
| lower viscosity/grade | Increases volatility |
| Foots oil or soft wax | Increases oil content |
| Fully refined wax | Increases n-paraffin content, lowers oil content |
| High n-paraffin wax[1] | Increases in n-paraffin content, lowers oil content |
| DWO[2] - lube basestock | Lowers n-paraffin content, raises oil content |
| Higher viscosity/grade | Decreases volatility |
| Foots oil or soft wax | Increases oil content |
| Fully refined wax | Increases n-paraffin content, lowers oil content |
| High n-paraffin wax[1] | Increases in n-paraffin content, lowers oil content |
| DWO[2] - lube basestock | Lowers n-paraffin content, raises oil content |

[1]E.g., non-isomerized Fischer-Tropsch wax
[2]DWO = dewaxed oil

To further illustrate the foregoing consider that a 600N slack wax with over 20 wt % oil may well have a n-paraffin content below 21 wt %. A fully refined 250–300N petroleum wax containing 60–80 wt % n-paraffins or a non-isomerized Fischer-Tropsch wax that typically contains greater than 90 wt % n-paraffins can be blended with the slack wax to bring the n-paraffin content of the wax composition to at least 21 wt % and preferably in the range of 21 wt % to 30 wt %.

Alternatively a dewaxed oil, such as a basestock in the 100–850N range are blended with sufficient petroleum wax or non-isomerized Fischer-Tropsch wax to provide a wax composition containing at least 21 wt % n-paraffins.

EXAMPLES

A series of wax blends were prepared with varying n-paraffins and oil content. These blends were then evaluated for use in construction board manufacture by reference to the water absorption and internal bond strength. The example wax compositions and the test results are given in Table 3.

TABLE 3

| Blend Description | Blend Name | Nominal Wax Grade (SUS) | Nominal Oil Grade (SUS) | Oil Content | n-paraffin Content | Thickness Swell (2 hours) | Thickness Swell (24 hours)[4] | Water Absorption (2 hours)[5] | Water Absorption (24 hours)[5] | Internal Bond Strength[5] |
|---|---|---|---|---|---|---|---|---|---|---|
| F-T wax[1]/DWO[2] | XD-01 | 600 | 600 | 89 | 10 | 9.9 | 30.2 | 25.5 | 71.3 | 0.277 |
| F-T wax[1]/DWO[2] | XD-02 | 600 | 600 | 83 | 15 | 8 | 24.8 | 20.3 | 58.5 | 0.324 |
| F-T wax[1]/DWO[2] | XD-03 | 600 | 600 | 78 | 20 | 7.6 | 21.7 | 19.4 | 52.9 | 0.332 |
| F-T wax[1]/DWO[2] | XD-04 | 600 | 600 | 72 | 25 | 6.7 | 17.7 | 14.9 | 39.5 | 0.326 |
| F-T wax[1]/DWO[2] | XD-05 | 600 | 600 | 67 | 30 | 6.3 | 18 | 14.4 | 39.2 | 0.3 |
| F-T wax[1]/DWO[2] | XD-06 | 600 | 600 | 56 | 40 | 5.5 | 15.7 | 11.7 | 33.2 | 0.291 |
| F-T wax[1]/DWO[2] | XD-07 | 600 | 600 | 45 | 50 | 4.8 | 14.4 | 11.2 | 31.9 | 0.313 |
| 600 N slack wax | XD-08 | 600 | — | 9.57 | 21 | 6.1 | 19.2 | 14 | 44.5 | 0.256 |
| 250–300 N slack wax/DWO | XD-09 | 300 | 250–300 | 50 | 21 | 6 | 16.4 | 12.1 | 38.6 | 0.293 |
| 100–150 slack wax/DWO | XD-10 | 100 | 100 | 66 | 23 | 5.7 | 17.1 | 12.2 | 41.8 | 0.285 |
| 600 N slack wax + F-T wax/DWO | XD-11 | 600 | 600 | 23 | 21 | 6 | 17.4 | 13.1 | 42.9 | 0.282 |

TABLE 3-continued

| Blend Description | Blend Name | Nominal Wax Grade (SUS) | Nominal Oil Grade (SUS) | Oil Content | n-paraffin Content | Thickness Swell (2 hours) | Thickness Swell (24 hours)[4] | Water Absorption (2 hours)[5] | Water Absorption (24 hours)[5] | Internal Bond Strength[5] |
|---|---|---|---|---|---|---|---|---|---|---|
| 600 N fully refined wax/DWO | XD-12 | 600 | 600 | 60 | 21 | 5.3 | 16.8 | 13 | 37.7 | 0.213 |
| 100 N F-T wax/DWO | XD-13 | 100 | 100 | 78 | 21 | 7.2 | 19.3 | 15.5 | 43.5 | 0.275 |
| 300 N slack wax | XD-14 | 300 | — | 12.9 | 39.6 | 5.6 | 15.4 | 11.7 | 33.5 | 0.308 |
| 600 N slack wax[3] | XD-15 | 600 | — | 9.57 | 21 | 4.9 | 15.1 | 11.7 | 33.7 | 0.349 |

[1]F-T wax = Fischer-Tropsch wax
[2]DWO = dewaxed oil
[3]This slack wax was used neat rather than in an emulsion
[4]Target maximum swell for this study was 20%. Commercial results are likely to be different because of different conditions such as press strengths.
[5]The trends for water absorption and internal bond strength values follow the thickness swell results.

Figure 2:
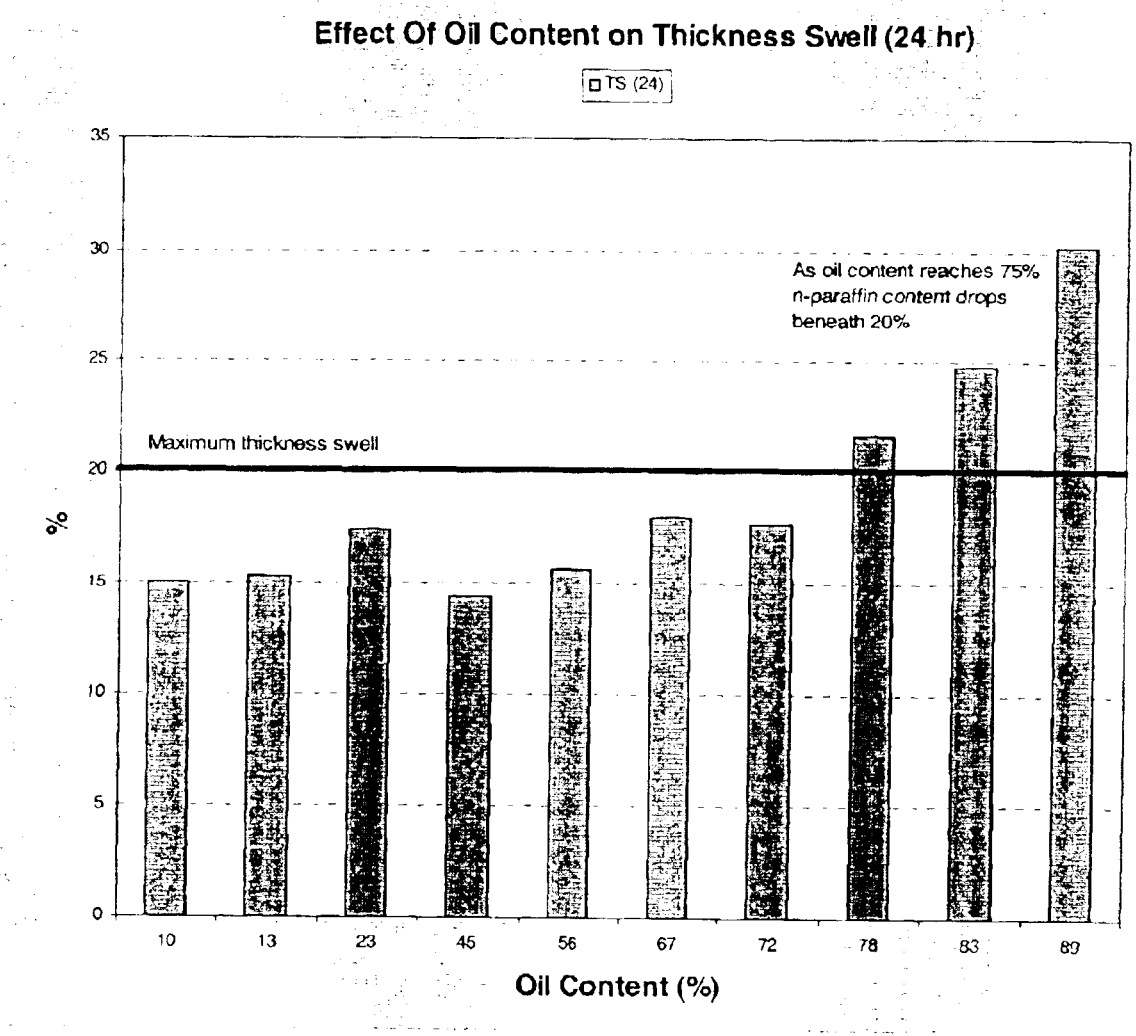
FIG. 2 illustrates the effect of oil content on thickness swell.

The effect of n-paraffin content on thickness swell and water absorption is graphically illustrated in FIG. 1 and the effect of oil content on thickness swell is shown graphically in FIG. 2.

The graphs and data illustrate that a n-paraffin level of at least 21 wt % is needed for good board performance and that oil content has no effect unless it is high enough to reduce the n-paraffin content below 21 wt %.

What is claimed is:

1. A method for preparing a wax composition suitable for use in making construction boards comprising:
   blending a first wax stream having an n-paraffin content less than 21 wt % with a sufficient amount of a second wax having an n-paraffin content greater than 21 wt % to provide a wax composition having at least 21 wt % of n-paraffin, the first wax stream being selected from group consisting essentially of slack wax, slack wax and a dewaxed oil, and a non-isomerized Fischer-Tropsch wax and a dewaxed oil.

2. The method of claim 1 wherein first the wax stream is a wax stream of grade 30 or greater.

3. The method of claim 1 wherein dewaxed oil is a lubricating oil basestock.

4. The method of claim 2 or 3 wherein the second wax is a non-isomerized Fischer-Tropsch wax.

5. A manufactured construction board product comprising about 90 to 98 wt % based on the total weight of the product of a natural fibrous material and a minor amount of a resin and a waxy composition comprising an oil and at least 21 wt % of a n-paraffin wax.

6. The product of claim 5 wherein the oil is a lubricating oil basestock.

7. A construction board product comprising about 90 to 98 wt %, based on the total weight of the products of a natural fibrous material and a minor amount of a resin and a waxy composition comprising a blend of a first wax stream having an n-paraffin content less than 21 wt % with a sufficient amount of a second wax having an n-paraffin content greater than 21 wt % to provide a wax composition having at least 21 wt % of n-paraffins.

8. A method for forming a blended wax composition suitable for use in composite board manufacture and having a specific selected volatility comprising:
   (a) obtaining a first wax of grade 30 or higher;
   (b) determining the n-paraffin content of the first wax; and
      (i) when the n-paraffin content is less tan 21 wt % blending the first wax with sufficient second wax having an n-paraffin greater than 21 wt % and having a viscosity whereby the blend has at least 21 wt % n-paraffin and the selected volatility;
      (ii) when the n-paraffin content is at least 21 wt % blending the first wax with a second wax or oil in an amount sufficient to provide a blend of the selected volatility and with a paraffin content of at least 21 wt %.

9. The method of claim 6 wherein the first wax is a slack wax.

10. The method of claim 8 wherein the first wax is a non-isomerized Fisher-Tropsch wax and wherein the first wax is blended with a dewaxed oil.

* * * * *